United States Patent [19]

Coburn et al.

[11] Patent Number: 4,640,092
[45] Date of Patent: Feb. 3, 1987

[54] COMBUSTION CHAMBER REAR OUTER SEAL

[75] Inventors: Robert E. Coburn, Mansfield Center; John A. Matthews, Melrose, both of Conn.

[73] Assignee: United Technologies Corporation, Hartford, Conn.

[21] Appl. No.: 835,136

[22] Filed: Mar. 3, 1986

[51] Int. Cl.[4] .......................... F02C 3/06; F02C 7/20; F02C 1/00

[52] U.S. Cl. .................................. 60/39.36; 60/722; 60/39.32

[58] Field of Search ................. 60/39.31, 39.32, 39.36, 60/39.75, 722; 415/134–139, 170 R, 217, 218, 189, 190; 277/188, 193, 216–219, 223, 224

[56] References Cited

U.S. PATENT DOCUMENTS

| 2,916,874 | 12/1959 | Worobel | 415/190 |
| 3,062,499 | 11/1962 | Peterson | 415/137 |
| 3,295,824 | 1/1967 | Woodwell et al. | |
| 3,565,545 | 2/1971 | Bobo et al. | |
| 3,842,595 | 10/1974 | Smith et al. | 415/189 |
| 4,083,648 | 8/1978 | Asplund | 415/189 |
| 4,149,373 | 4/1979 | Jones et al. | |
| 4,251,986 | 2/1981 | Thompson et al. | 60/39.32 |
| 4,391,565 | 7/1983 | Speak | 415/190 |

FOREIGN PATENT DOCUMENTS

| 18892 | 11/1980 | European Pat. Off. | 415/189 |
| 2741463 | 6/1978 | Fed. Rep. of Germany | 415/189 |
| 68611 | 7/1977 | Japan | 415/189 |

Primary Examiner—Louis J. Casaregola
Assistant Examiner—Timothy S. Thorpe
Attorney, Agent, or Firm—Charles A. Warren

[57] ABSTRACT

A sealing device which is adapted to cooperate with and be secured to the outwardly extending tabs on the inlet vanes for the turbine in which the tabs provide a forwardly facing surface and the sealing device has a rearwardly facing surface in contact with one another and with the parts secured together by a row of bolts in which the sealing element has a flange along the outer edge of the element between certain bolts to reinforce the plate and between other bolts the sealing element is reinforced by plates extending between adjacent bolts and secured to the forward side of the sealing element by said bolts.

9 Claims, 4 Drawing Figures

COMBUSTION CHAMBER REAR OUTER SEAL

DESCRIPTION

1. Technical Field

The flexing of the sealing element between the rearward end of the combustion chamber outer wall and the outer flanges on the turbine inlet guide vanes are minimized to prevent leakage at this point by providing stiffeners and stiffening plates on the wall of the seal where it engages the vane outer flanges thereby to hold a seal surface more securely against the sealing surface on the flanges.

2. Background of the Invention

One area of uncontrolled cooling air leakage that has regularly presented a problem is where the cooling air passes inwardly from the cooling air duct at the turbine inlet rather than entering and cooling the outer ends of the turbine vanes and the surrounding shroud. This problem existed in early aircraft gas turbines. U.S. Pat. No. 2,702,454 shows a construction in which the cooling air is directed to the turbine vanes and shrouds in a different manner. In a later U.S. Pat. No. 3,670,497, a different arrangement has been utilized to avoid the need for a seal at this point. As development of gas turbines continued and higher performance was expected it became more necessary to change the structure at this point to allow the desired flow and to minimize leakage with a simplified structure. A leakage seal for use in this location is shown in U.S. Pat. No. 4,251,986 in a different form of seal and a similar location is shown in U.S. Pat. No. 4,425,078. The latter patent has the desired simplified seal construction then provided with an arrangement by which leakage can be significantly controlled.

DISCLOSURE OF INVENTION

The present invention further simplifies the construction of the sealing element which is held against the outwardly extending flanges on the turbine inlet vanes by providing integral flanges extending forwardly from the edge of the sealing element between alternating adjacent areas of securing bolts and by mounting a flange reinforcing strip between the other adjacent pairs of bolts. These bolts hold the reinforcing strips or plates in position. The flanges on the vanes are sloped away from the surface contacted by the sealing element to provide an edge on the flange at the bolt circle along which the seal element may pivot as a result of a severe bending moment load on the seal element.

The foregoing and other objects, features and advantages of the present invention will become more apparent from the following description of preferred embodiments and accompanying drawings.

BEST MODE FOR CARRYING OUT THE INVENTION

Figure 1:
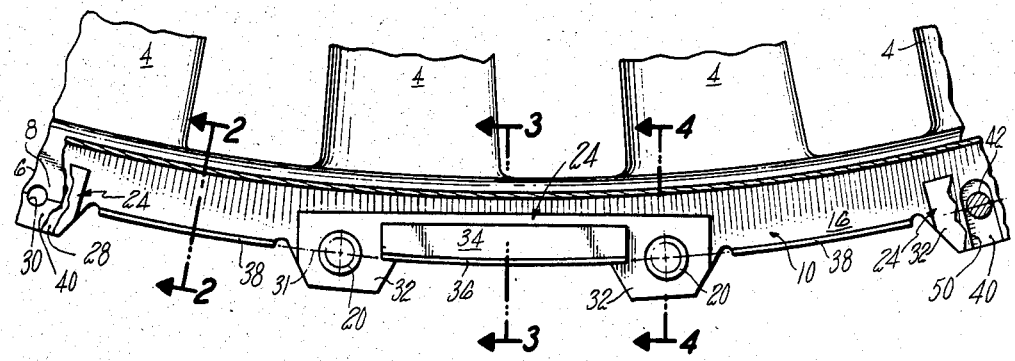
FIG. 1 is a transverse view of a portion of the sealing element of the present invention.
Figure 2:
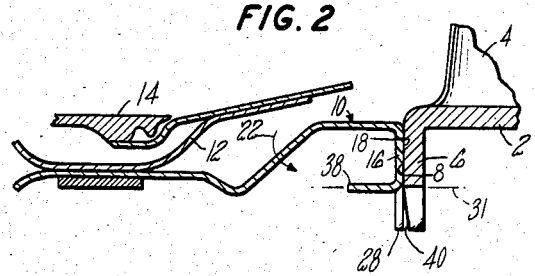
FIG. 2 is a fragmentary longitudinal sectional view through a gas turbine inlet at the point where the seal structure is located, this view being along the line 2—2 of FIG. 1.

The invention is shown in a sealing element located directly upstream of the outer flanges 2 of the turbine inlet vanes 4 of a gas turbine engine. These flanges 2 have tabs 6 extending outwardly along the forward edge of the shroud to form a flat forwardly facing surface 8 against which the sealing element 10 in the form of a ring is held. This sealing element is secured to the downstream end of the outer sealing wall 12 of the combustion chamber. The inner wall 14 is the outer wall of the combustion chamber. The structure is arranged to direct the cooling air from this duct into the turbine to flow along the inner surfaces of the shrouds 2 and around the outer ends of the vanes 4.

Figure 4:
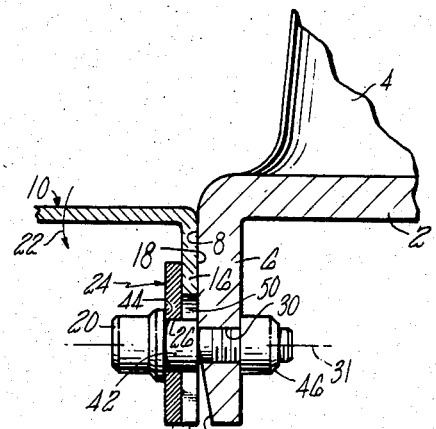
FIG. 4 is a sectional view along the line 4—4 of FIG. 1.

The seal element 10 has at its rearward end an outwardly extending portion or flange 16 providing a flat surface 18 cooperating with and held against the surface 8 of tabs 6 by a row of bolts 20 that extends through the seal element and the tabs 6 on the vanes as shown in FIG. 4. The high temperature combustion gases entering the turbine inlet past vanes 4 cause the combustion chamber outer wall components 12 and 14 to grow thermally producing a bending moment load in direction 22 in the shielded and cooled seal element 10. This moment load causes a toroidal twisting of the seal element 10 to reduce the contact between the element 10 and the surface 8, and the purpose of the present invention is to maintain contact between element 10 and surface 8 and also to reinforce the sealing element in a circumferential direction to prevent distortion of the element due to circumferential thermal gradients.

To accomplish this the seal element is reinforced by a plurality of supporting plates 24 extending between adjacent bolts 20 and having openings 26 therein to receive the adjacent bolts. These plates are positioned on the upstream side of the flange 16. The seal element flange 16 generally terminates along the centerline of the bolts 20 except for tabs 28 adjacent the bolt holes 30. The supporting plates 24 also terminate generally along the centerline of the bolts and have tabs 32 at the bolt locations at opposite ends of the plates to accommodate the bolt attachment. These tabs 32 are generally coextensive with the tabs 28 on the seal element. For further reinforcement, each plate 24 has an angularly flanged member 34 secured to its forward surface between the ends internally of the line of bolts. This member 34 has a forwardly projecting flange 36 spaced radially inwardly of the line of bolts and extending nearly the length of the plate.

Figure 3:
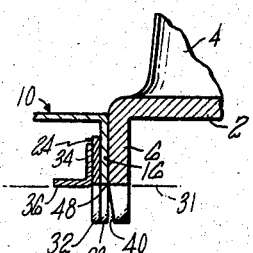
FIG. 3 is a sectional view along the line 3—3 of FIG. 1.

These plates 24 extend between pairs of bolts as shown and there are no plates located between the adjacent pairs of bolts connected by the plates as shown in FIG. 1. To reinforce these areas the seal element has a forwardly projecting flange 38 along the outer edge of the flange 16 and in line with the row of bolts. These flanges 38 terminate short of the bolts and the ends of the plates 24 as shown in FIG. 1. As above stated, the seal element flanges 16, shroud tabs 6, and supporting plates 24 all have a general outer edge limit ending radially at the circumferential centerline of the bolts 20 as at 31. At the bolt locations the seal element flange 16, shroud tabs 6, and supporting plates 24 all have the outwardly extending local tabs 28, 32 to provide bearing surfaces for the bolt attachments as shown in FIG. 4. In addition, the shroud tabs 6 have surfaces 40 that slope radially rearward from the plane of surface 8. The slope starts outward at the bolt centerlines 31 as shown in FIG. 3. This slope from surface 8 permits the seal element 10 to rotate toroidally about a circumferential line of contact at the bolt centerline so surfaces 18 do not contact surfaces 8 and thereby prevent leakage of cooling air past the seal.

Also, bolts 20 have a shoulder 42 to control the space between the bolt head surface 44 and the tab surface 8 to allow relative radial displacement between seal flange element 16 and shroud tabs 6. Tabs 6 have holes 30 with a diameter smaller than the bolt shoulder 42. The nut 46 clamps the bolt to the shoulder tab 6 and holds it in position. Supporting plates 24 have holes 26 that fit over the bolt shoulder 42 and under the bolt head 44 and thereby position the plates 24. The seal element flange 16 in the area of the bolts has radial slots 50, FIG. 4, which permit the radial relative displacement while maintaining contact between surfaces 8 and 18 for sealing.

With this arrangement the seal is generally held in area contact with the surface 8 on the tabs 6 over substantially the entire area of the flange 16 and bending is resisted by the flanges 38 and the flanged plates 24. Obviously, these flanges and flange plates also prevent distortion of the seal element in an axial direction. Under heavy moment loads the seal may pivot to some extent about the edge 48, but even then sealing contact is maintained at least in line contact under the most adverse conditions.

Also, the seal element flange 16 has a plurality of supporting plates 24 extending between adjacent bolts 20 and having openings 26 therein to receive the adjacent bolts. These plates are positioned on the upstream side of flange 16. For further reinforcement, each plate 24 has an angular flanged member 34 secured to its forward surface between the ends integrally of the line of bolts, and this member has a forward projecting flange 36 spaced radially inwardly of the line of bolts and extending nearly the length of the plate.

Also, between pairs of bolts 20 that are not connected by supporting plates 24, the seal element flange 16 has a forward projecting reinforcing integral flange 38 and is located in line with the centerline of the bolts 20 to further assist in maintaining contact between surfaces 8 and 18 during seal element 10 twisting. This reinforcing flange 38 terminates short of the bolts and the ends of the plates 24 as shown in FIG. 1.

It should be understood that the invention is not limited to the particular embodiments shown and described herein, but that various changes and modifications may be made without departing from the spirit and scope of this novel concept as defined by the following claims.

We claim:

1. A sealing device for sealing between the downstream end of a combustion chamber outer wall and a forwardly facing surface formed by tabs on the turbine inlet vanes, the device including:
    a sealing element having a flat rearwardly facing radial portion for contact with said forwardly facing surface formed by the tabs,
    a row of bolts securing the elements to said tabs,
    reinforcing plates extending between adjacent bolts in the row and secured by said bolts to the forward side of said portion, and
    flanges on the outer edge of said portion of the element in the spaces not covered by the plates.

2. A sealing device as in claim 1 in which the plates carry reinforcing angular flanges on the forward surface, one leg of the flange extending forwardly.

3. A sealing device as in claim 1 in which the plates extend between adjacent bolts making up a pair of bolts and the flanges on the element are located between said adjacent plates.

4. A sealing device as in claim 1 in which the flange on the portion of the element is generally in line with the row of bolts.

5. A sealing device as in claim 2 in which the forwardly extending leg of the flange on the plate is close to but inwardly of the row of bolts.

6. A sealing structure for sealing between the downstream end of a cooling air duct and a forwardly facing surface formed by tabs on the turbine inlet vanes the structure including the combination of,
    a row of vane shrouds having outwardly extending tabs at the forward end to form a forwardly facing surface,
    a sealing element having a flat rearwardly facing portion for contact with said forwardly facing surface,
    a row of bolts securing said sealing element to said tabs,
    reinforcing plates extending between adjacent bolts in a row and secured by said bolts to the forward side of said portion, and flanges on the outer edge of said portion of the element in the spaces not covered by the plate.

7. A device as in claim 6 in which the plates carry reinforcing angular flanges on the forward surface, one leg of the flanges extending forwardly and being located close to but inwardly of the row of bolts.

8. A device as in claim 6 in which the flange on the outer edge of said element is generally in line with the row of bolts.

9. A sealing structure as in claim 6 in which the surface of said tabs, outwardly of the row of bolts, slopes away from the surface engaged by said seal.

* * * * *